Jan. 27, 1970  H. D. TANZMAN  3,492,570
SPEED MEASURING SYSTEM FOR MOVING VEHICLES
EMPLOYING A DIGITAL TIME MEASURING DEVICE
WITH A NONLINEAR COUNT RATE
Filed Sept. 19, 1967                                    2 Sheets-Sheet 2

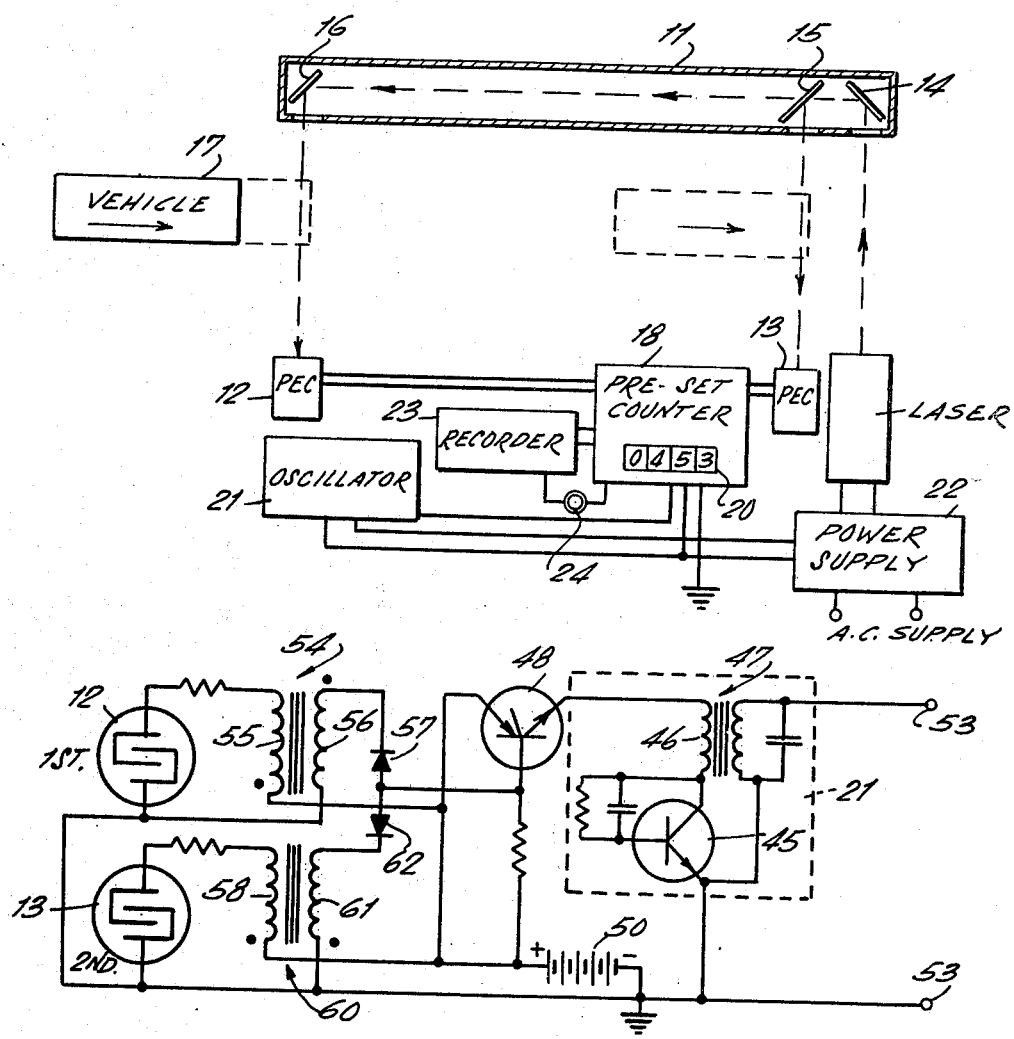

INVENTOR.
HERBERT D. TANZMAN

ATTORNEY

United States Patent Office 3,492,570
Patented Jan. 27, 1970

3,492,570
SPEED MEASURING SYSTEM FOR MOVING VEHICLES EMPLOYING A DIGITAL TIME MEASURING DEVICE WITH A NONLINEAR COUNT RATE
Herbert D. Tanzman, Elberon, N.J., assignor to Winslow Tele-Tronics, Inc., Asbury Park, N.J., a corporation of Pennsylvania
Filed Sept. 19, 1967, Ser. No. 668,822
Int. Cl. G01p 3/56
U.S. Cl. 324—70                    10 Claims

ABSTRACT OF THE DISCLOSURE

A speed measuring system for vehicles is described having two sensing stations positioned along the line of the vehicle movement. When the vehicle passes the first station, a counter is activated to count down from a present value, depending upon the distance between the two stations. When the vehicle passes the second station the counter is stopped, the final indication on the counter being the speed of the vehicle. The relationship of the speed to the counter values is generally nonlinear and two methods of correcting for the nonlinearity are described.

This invention relates to a speed measuring system for vehicles. It has particular reference to means and methods of correcting the nonlinearity of a time-distance characteristic so as to provide a direct read-out on a digit counter.

Many types of speed measuring systems have been devised for vehicles, projectiles, and other objects. One of the systems includes two sensing stations and a means for measuring the elapsed time the vehicle takes to move between the two stations. Since the objects with the higher speeds take less time than slower moving objects, an inverse relationship exists which must be compensated for when the correct speed is to be determined. The present invention compensates for inverse readings and produces a digit readout equal to the vehicle speed.

One feature of the present invention includes a preset counter which starts to count down, in a substractive manner, a predetermined time after the vehicle enters the first sensing station.

Another feature of the invention includes a set of spiral gears with varying radii. This gear combination corrects for the nonlinear characteristics of the system.

Another feature of the system includes an oscillator which varies in freqeuncy during the time the vehicle is between the sensing stations.

For a better understanding of the present invention, together with other details and features thereof, reference is made to the following description taken in connection with the accompanying drawings.

BRIEF DESCRIPTION OF THE FIGURES

FIGURE 1 is a top plan view of the optical system with the circuits shown in block.

FIGURE 2 is a schematic diagram of the photoconductive cells, the pulse transformers, the semiconductor gate, and the oscillator.

FIGURE 4 is a cross-sectional view of a spiral spring shown in FIGURE 3 and taken along line 4—4 of that figure.

DESCRIPTION OF THE PREFERRED EMBODIMENT

Figure 3:
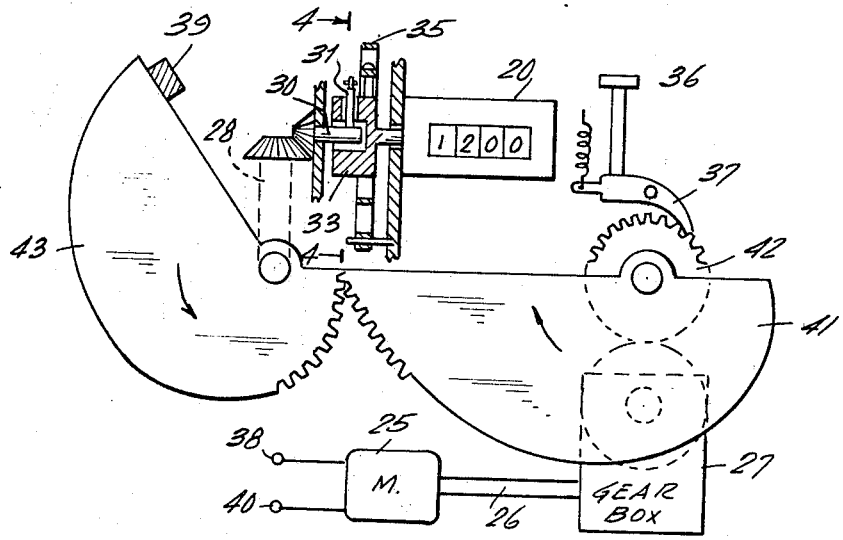
FIGURE 3 is a schematic layout showing one form of compensation for nonlinearity.

Referring now to FIGURE 1, the complete system is shown, comprising a source of light 10, which may be a laser, a compartment 11, which holds three mirrors, and two photosensitive transducers 12 and 13 for sensing beams of light from the source. The compartment 11 houses a first total reflecting mirror 14 for reflecting all the light received from the source 10. A second mirror 15 is half-silvered so that it reflects roughly half of the light from mirror 14 to the second photosensitive transducer 13. The remainder of the light travels along the compartment to the third mirror 16 which reflects the light beam to the first photosensitive transducer 12. The compartment 11 is set up on one side of a highway and the source 10 and photosensitive transducers on the other side. It is obvious that a vehicle 17 passing along the highway will first intercept the light beam which activates cell 12, and then, after traveling the distance between the two beams, intercept the second beam which activates cell 13.

The photocells 12 and 13 may be of the photoconductive type, each having two electrodes. The cells are connected to a control circuit 18 which houses the counter 20. An oscillator 21 is connected to the counter circuit 18 and a power supply 22 is coupled to all units. A recorder 23 may be connected to the counter circuit 18 to print the position of the counter dials after each measurement but this component is not necessary. If a recorder is used, a print switch 24 is employed to operate the printing cycle.

Figure 5:
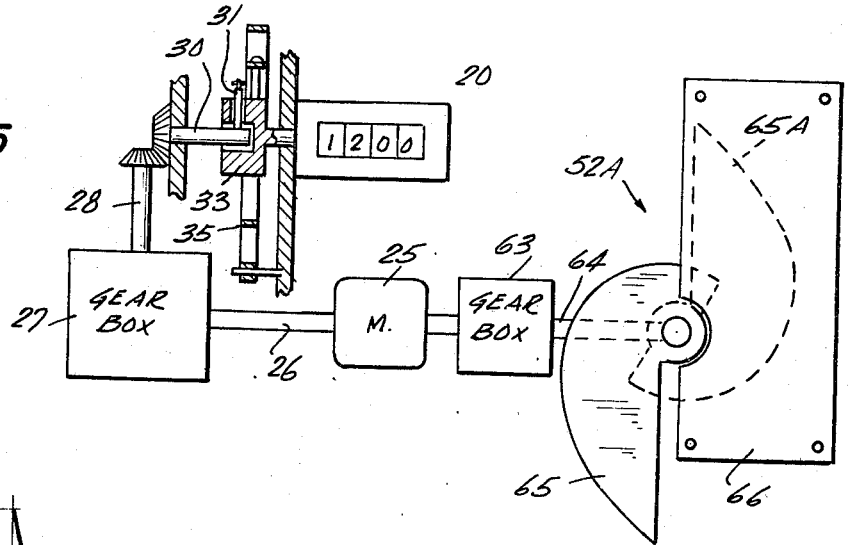
FIGURE 5 is a schematic view, partly in section, showing an alternate method of compensating for nonlinearity.
Figure 6:
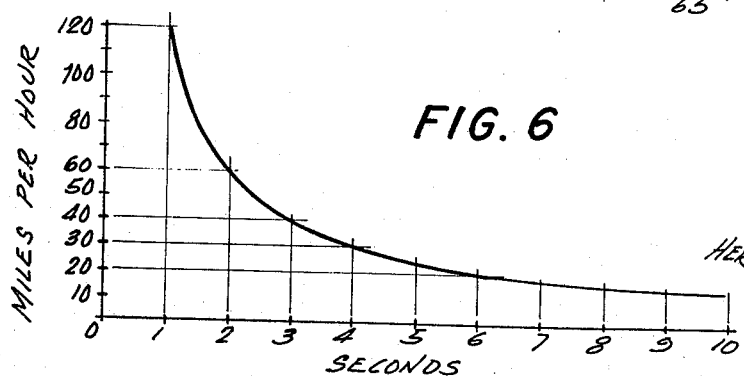
FIGURE 6 is a graph showing the curve plotted between miles per hour and elapsed time in seconds for an installation having stations 176 feet apart.

If the beams reflected by mirrors 15 and 16 are separated by 176 feet, a car passing the system at a speed of 120 miles per hour, takes just one second between breaking the first and second beams (see FIGURE 6.) If the upper limit of the indicating device is 120 miles per hour, the time between the breaking of the first beam and the start of the count down should be just one second. If higher speeds are to be measured, such as 240 miles per hour, the highest reading of the indicating device is 240 and the time delay for the count down is one-half second. This time delay may be built into the system by means of a pin and slot arrangement shown in FIGURES 3, 5 and 4. An alternating current synchronous motor 25 is activated when the first beam is broken, the motor turns shaft 26 connected through a gear reduction unit 27 to the shafts 28 and 30. Shaft 30 is secured to a radial pin 31 which moves in a slot 32 before limiting against the slot end and then turning outer shaft 33 secured to the counter 20. A light spring 4 retains the pin 31 in its starting position and a spiral spring 35 acts to position the counter at its zero position before the measuring cycle starts. After a measurement has been made and the speed noted, the entire mechanism may be returned to the starting position by depressing button 36, thereby releasing a ratchet pawl 37 and permitting the spiral spring 35 to unwind all the gears. The release action may also uncouple a cltch (not shown) between the gear box 27 and shaft 28 so that the gears and motor 25 are not turned back during the reset action. The normalizing action is limited by a stop 39.

The mechanism shown in FIGURE 3 illustrating one compensating means for producing a linear characteristic and for showing the exact speed of the vehicle, no matter what the time interval between the breaks in the light beams. In this arrangement, the oscillator generates a constant frequency (60 cycles per second). The oscillator output is applied to motor terminals 38 and 40 and the gear box transfers the movement to a first spiral gear 41 by means of a circular gear 42 on the same shaft. The first spiral gear 41 meshes with a second spiral gear 43 and transmits a variable speed to the second gear starting at a high speed and gradually reducing the speed ratio until at the end of travel the ratio is at its lowest value. The second spiral gear is coupled to the counter 20 by means of the pin and slot connection so that, after a one second time delay, the counter moves quite fast counting down to 60 in the second second, to 40 in the third second, and so on until the last time interval or tenth second, the counter moves only from a digit reading of 13.3 to 12. While gear 42 is turning, the ratchet pawl 37 is moved over each tooth in succession until the vehicle breaks the second light beam. At this time the oscillator is stopped and the motor and all the gears associated with it are also stopped and retained in their operated position by pawl 37. The operator now reads the counter dials which give the correct speed without the application of any correction factor. The operator next depresses button 36 and the spiral spring 35 moves all gears to the starting position, ready for another measurement.

The electrical circuit is shown in FIGURE 2. The oscillator 21 includes a transistor 45 having a collector supply circuit connected in series with the primary winding 46 of a transformer 47, the collector-base electrodes of a semiconductor gate turn-off 48, and a source of direct current power 50, which may be a battery or the rectified power from the power supply 22. The emitter of transistor 45 is grounded and a suitable bias applied to the transistor base. A secondary winding 51 of transformer 47 and a capacitor 52 form a resonant circuit which establishes the frequency of oscillation. The output of the oscillator is applied to terminals 53 for operating motor 25.

The gate turn-off switch 48 is controlled to pass current from source 50 by a pulse generated by transformer 54. The pulse is generated when the photoconductive cell 12 is made nonconductive by a break in the light beam. The primary winding 55 of transformer 54 is connected in series with source 50 and the cell 12. Normally, direct current passes through winding 55 and the cell because a light beam is incident on the cell face. When this beam is interrupted, a positive pulse is generated in secondary winding 56 which passes through diode 57 and is applied to the base electrode of the gate switch 48 making it conductive and passing current to the oscillator for generating alternating current. Switch 48 remains in its conductive condition until a negative pulse is applied to its base. When the vehicle passes the first sensing station and the light beam again is applied to cell 12, a negative pulse is generated in winding 56 but this pulse is blocked by diode 57 and produces no result.

Cell 13 is connected in series with the source 50 and the primary winding 58 of a transformer 60. The secondary winding 61 is connected to the base electrode of switch 48 in series with a blocking diode 62. When the vehicle intercepts the second light beam, a negative pulse is generated in secondary winding 61 which passes through diode 62 and is applied to the base electrode of switch 48, turning it off and also turning off the oscillator. After the vehicle has passed the second sensing station, a positive pulse is generated in winding 61 but this is blocked by diode 62 and produces no action.

An alternate compensating means is shown in FIGURE 5. The same motor 25 and gear box 27 are used and the mechanical coupling to the counter 20 is the same. An additional gear box 63 is added and the output shaft 64 from this box is connected to a series of movable capacitor plates 65 which are adapted to turn into the spaces between stator plates 66 and thereby create a variable capacitor 52A. This capacitor is substituted for capacitor 52 in the oscillating circuit shown in FIGURE 2 and produces a variable frequency output which depends upon the duration of the operation of the oscillator. The plates 65 are designed so that a high frequency is generated when the first beam is broken and then the frequency is progressively lowered as the counter digit values are reduced. If the vehicle is moving at a speed of 12 miles per hour, the counter will be run from 120.0 to 12.0 and the movable plates 65 will then be in the position shown in the dotted lines 65A. By the proper selection of the shape of the plates, a linear relationship results. A combination of a fixed capacitor 52 and a variable capacitor 52A has been found to produce the desired results.

To summarize, the main features of the invention are (a) a counter that counts down (b) a delayed action means, such as a pin and slot coupling, and (c) a compensating means which produces linearity and gives a correct speed measurement at the end of any indicated time interval. Various compensating means can be used and the pin and slot coupling can be placed anywhere in the mechanical system.

Having thus fully described the invention, what is claimed as new and desired to be secured by Letters Patent of the United States, is:

1. A speed measuring system for measuring and indicating the speed of an object as it passes between the two stations comprising, a source of light, means for directing the light into a collimated beam, a system of mirrors for separating the beam into two parallel beams spaced from each other and directed across a line of movement of an object whose speed is to be measured, a first photosensitive transducer positioned for activation by the first of said beams, a second photosensitive transducer positioned for activation by the second of said beams, an oscillator for generating alternating current power, a first control means coupled between the first photosensitive transducer and the oscillator for turning on the oscillator a predetermined time interval after an object cuts off the first beam, a second control means coupled between the second photosensitive transducer and the oscillator for turning off the oscillator when the object cuts off the second beam, a digit counter connected to the oscillator for operation only when the oscillator is generating current, said counter being preset at a predetermined value and operated so as to reduce the digit values during its operation, and a compensating means for reducing the speed of the counter during the time the oscillator is turned on in order to make the readings of the counter correspond to the speed of the object.

2. A speed measuring system as claimed in claim 1 wherein said oscillator is connected to a synchronous motor and the motor is mechanically coupled to said counter.

3. A speed measuring system as claimed in claim 2 wherein the counter is coupled to a resilient return means and a ratchet pawl for maintaining the counter in its activated position until a reading can be noted.

4. A speed measuring system as claimed in claim 3 wherein a manually operable control is provided for releasing the pawl and for normalizing the counter at the end of a measuring operation.

5. A speed measuring system as claimed in claim 3 wherein said compensating means includes two spiral gears meshing with each other and coupled between motor and the counter.

6. A speed measuring system as claimed in claim 3 wherein said compensating means includes a resonant circuit connected in said oscillator for determining the frequency generated, said resonant circuit incluuding a variable capacitor coupled to said motor for lowering the frequency of the oscillator during the time the oscillator is turned on.

7. A speed measuring system as claimed in claim 3 wherein a semiconductor gate turn off switch is connected in series with the power supply of tde oscillator, the conductance of said gate turn off switch being under control of the first and second photosensitive transducers.

8. A speed measuring system as claimed in claim 7 wherein each of said transducers is coupled to the gate turn off switch by a pulse transformer.

9. A speed measuring system as claimed in claim 7 wherein said light source is a laser.

10. A speed measuring system as claimed in claim 7 wherein said motor is mechanically coupled to the counter through a time delay means such as a pin and slot connection for delaying the movement of the counter until a predetermined time after the motor starts.

References Cited

UNITED STATES PATENTS

| 3,079,553 | 2/1963 | Brown | 324—70 |
| 3,381,219 | 4/1968 | Dumbeck | 324—70 |

FOREIGN PATENTS

| 520,813 | 2/1931 | Germany. |
| 560,603 | 9/1944 | Great Britain. |
| 1,188,816 | 9/1959 | France. |

RUDOLPH V. POLINEC, Primary Examiner

M. J. LYNCH, Assistant Examiner

U.S. Cl. X.R.

235—151.32